United States Patent
Roberts et al.

(10) Patent No.: US 9,612,972 B2
(45) Date of Patent: Apr. 4, 2017

(54) APPARATUSES AND METHODS FOR PRE-FETCHING AND WRITE-BACK FOR A SEGMENTED CACHE MEMORY

(71) Applicant: MICRON TECHNOLOGY, INC., Boise, ID (US)

(72) Inventors: David Roberts, Ann Arbor, MI (US); J. Thomas Pawlowski, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 228 days.

(21) Appl. No.: 13/692,907

(22) Filed: Dec. 3, 2012

(65) Prior Publication Data
US 2014/0156948 A1    Jun. 5, 2014

(51) Int. Cl.
G06F 12/00    (2006.01)
G06F 12/0895    (2016.01)

(52) U.S. Cl.
CPC ...... G06F 12/0895 (2013.01); *Y02B 60/1225* (2013.01)

(58) Field of Classification Search
CPC ............. G06F 12/0891; G06F 12/0815; G06F 12/0862
USPC .......................................... 711/113, 118–146
See application file for complete search history.

(56) References Cited

U.S. PATENT DOCUMENTS

| | | | |
|---|---|---|---|
| 5,319,768 A | 6/1994 | Rastegar | |
| 5,339,322 A | 8/1994 | Rastegar | |
| 5,619,675 A * | 4/1997 | De Martine et al. | 711/133 |
| 5,893,150 A * | 4/1999 | Hagersten | G06F 12/0888 |
| | | | 711/133 |
| 5,905,996 A | 5/1999 | Pawlowski | |
| 5,987,571 A * | 11/1999 | Shibata et al. | 711/141 |
| 6,658,552 B1 | 12/2003 | Klein | |
| 6,757,840 B1 | 6/2004 | Pawlowski | |
| 7,480,761 B2 * | 1/2009 | Birrell | G06F 3/061 |
| | | | 711/103 |
| 2002/0069331 A1* | 6/2002 | Chauvel et al. | 711/144 |
| 2003/0120674 A1* | 6/2003 | Morita et al. | 707/100 |

(Continued)

OTHER PUBLICATIONS

Chen, et al., "Accurate and Complexity-Effective Spatial Pattern Prediction", 10$^{th}$ Int'l Symp. High-Performance Computer Architecture (HPCA), Feb. 2004, 1-12.

(Continued)

*Primary Examiner* — Mark Giardino, Jr.
*Assistant Examiner* — Tasnima Matin
(74) *Attorney, Agent, or Firm* — Dorsey & Whitney LLP (57) ABSTRACT

Apparatuses and methods for a cache memory are described. In an example method, a transaction history associated with a cache block is referenced, and requested information is read from memory. Additional information is read from memory based on the transaction history, wherein the requested information and the additional information are read together from memory. The requested information is cached in a segment of a cache line of the cache block and the additional information in cached another segment of the cache line. In another example, the transaction history is also updated to reflect the caching of the requested information and the additional information. In another example, read masks associated with the cache tag are referenced for the transaction history, the read masks identifying segments of a cache line previously accessed.

31 Claims, 7 Drawing Sheets

(56) References Cited

U.S. PATENT DOCUMENTS

| | | | | |
|---|---|---|---|---|
| 2004/0059877 | A1* | 3/2004 | Brown | G06F 12/0811 |
| | | | | 711/144 |
| 2005/0071601 | A1* | 3/2005 | Luick | 711/206 |
| 2007/0094462 | A1* | 4/2007 | Hill et al. | 711/158 |
| 2008/0301373 | A1* | 12/2008 | Harada et al. | 711/133 |
| 2010/0293339 | A1* | 11/2010 | Arimilli et al. | 711/137 |

OTHER PUBLICATIONS

Kumar, et al., "Exploiting Spatial Locality in Data Caches using Spatial Footprints", $25^{th}$ Ann. Int'l Symp. Computer Architecture (ISCA), Jun. 1998, 1-12.

Yoon, et al., "The Dynamic Granularity Memory System", Int'l Symp. Computer Architecture (ISCA), Jun. 2012, 1-12.

* cited by examiner

APPARATUSES AND METHODS FOR PRE-FETCHING AND WRITE-BACK FOR A SEGMENTED CACHE MEMORY

TECHNICAL FIELD

Embodiments of the invention relate generally to cache memories, and in one or more particular embodiment, to cache memories having segmented cache lines.

BACKGROUND OF THE INVENTION

Cache memories may be used for temporarily storing information read from main memory and to be written to main memory. Cache memories are typically smaller than main memory and can store only a portion of the information stored in main memory. Cache memories are typically configured to provide cached information responsive to a read request faster than main memory can provide the information. If requested information is present in the cache memory, it can be provided much sooner than if the information is read from main memory. Similarly, information may be written to cache memory in less time than writing the information to main memory. The cached information will need to be written to memory eventually, for example, upon eviction of the cached information, but utilizing the cache for writing information allows for fast writing of the information.

Cache memories are typically organized into cache lines in which information read from main memory is stored or information to be written to main memory is stored. In caching information in cache memory, an entire cache line of information is read from memory, even if only a portion of the entire cache line of information is needed. When writing information from cache memory to main memory, the entire cache line of information is written-back even if only a portion of the entire cache line of information needs to be updated in main memory. As a result, there are often many more memory transactions between cache memory and main memory than needed to read requested information into cache or to write information to main memory. The excess memory transactions consume power, reduce performance, and with some types of main memory, result in unnecessary wear of the memory.

Recently, DRAM main memory system designs have moved towards independent control of individual DRAM chips, rather than lock-step control of several chips in parallel. This facilitates transaction sizes as small as 8 Bytes, whereas the current minimum is 64 Bytes. Accessing fewer chips results in less row activation power (a problem called over-fetch). It may be desirable to allow a data processing apparatus to take advantage of such memory systems, while currently the access granularity is fixed to a large size.

DETAILED DESCRIPTION

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, timing protocols, and software operations have not been shown in detail in order to avoid unnecessarily obscuring the invention.

Figure 1:
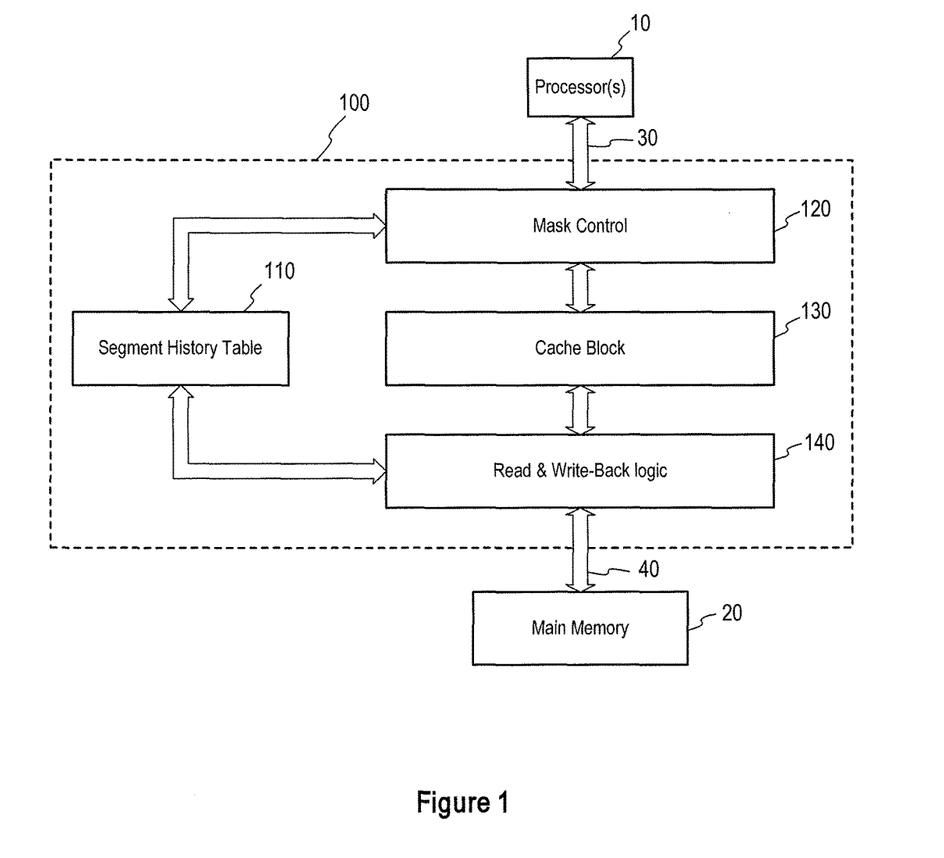
FIG. 1 is a block diagram of an apparatus including a cache according to an embodiment of the invention.

FIG. 1 illustrates an apparatus (e.g., an integrated circuit, a memory system, an electronic device or system, a smart phone, a tablet, a computer, a server, etc.) including a cache 100 according to an embodiment of the invention. The cache 100 is coupled to a processor or processors 10 through a system bus 30, and is further coupled to main memory 20 through a memory bus 40. The cache 100 is configured to cache information read from the main memory 20 by the processors 10 or to be written to the main memory 20. The cache 100 includes a cache block 130 coupled to a transaction history table 110, mask control 120, and read and write-back logic 140. Although the term transaction history "table" is used, the transaction history table 110 may be implemented as other structures of transaction history information, for example, as a queue, cache, or other structure. Thus, the term "table" is not intended to limit the structure of transaction history to a table. The cache block 130 is configured to store the information read from or to be written to the main memory 20. As will be described in more detail below, the cache block includes cache lines in which the information is stored. Each of the cache lines has an associated tag, valid bit, and dirty bit. The tag is used to identify the information stored in a cache line, for example, based on the addresses in main memory where the information is stored, and the valid and dirty bits provide the state of the information stored in the cache line.

Each of the cache lines is segmented into a plurality of segments, and each of the segments has a valid bit and a dirty bit associated with it. The valid and dirty bits indicate a state for the information stored in the associated segment. For example, a valid bit when set may indicate that the information stored in the associated segment is valid, and a dirty bit when set may indicate that the information stored in the segment has changed (e.g., new information has been written to the segment). The cache lines may be segmented logically, that is, for example, each of the segments is individually accessible through the use of logical operations, which may include masking, addressing, or other operations. The size of the segments may be any size, but may be sized to correspond with a unit size for reading and writing the main memory 20. The size of a segment may also be based at least in part on the physical organization of the memory channels of the memory bus 40. For example, in a DDR3 system with a burst length of 8 and including x8 memories, a minimum burst size of 8-bytes and segment size of 8-bytes are implied. In contrast, where x16 memories are used per memory channel, a 16-byte segment may be more appropriate. A non-limiting example is having 8-byte segments for a 64-byte cache line. Other sizes may be used as well.

In contrast to conventional cache blocks where an entire cache line of information (e.g., data) is read from memory or written-back to memory, certain embodiments of the invention allow for less than an entire cache line of information to be moved between the cache line and memory. For example, information for one or more segments of a cache line (which is/are sometimes hereinafter referred to as a segment(s) of information) may be read from memory or written-back to memory. Thus, information requested by a read command, for example, may be read into a cache line without having to read an entire cache line of information from memory. However, information in addition to the requested information may also be read into the cache line as well, thereby "pre-fetching" information and caching the pre-fetched information along with the requested information in one or more segments of the cache line. The determination of the additional information to read from memory may be based on a transaction history associated with the cache block (e.g., a transaction history for a cache line and/or for the addresses in main memory associated with information cached by the cache line) for the cache line or memory address, as will be described in more detail below. One or more segments of information may be written-back to memory as well, rather than writing-back the entire cache line of information, for example, upon eviction of the cache line.

The history table 110 stores read masks, which may be updated to reflect when a segment or segments of the cache block 130 are accessed (e.g., information is read from the segment) over a period of time. The history table may also store write masks associated, which may be updated to reflect when a segment or segments of the cache block 130 are accessed (e.g., information is written to the segment) over a period of time. The stored read and write masks for a cache line may represent a transaction history for segments of the cache block 130. As will be described in more detail below, the transaction history may be used for determining which segments of information are to be read (e.g., fetched) from or written-back to main memory 20 (e.g., which addresses in main memory are to be read from or written-back to).

In some embodiments, the read masks and write masks are associated with cache lines of the cache block 130. For example, the history table 110 may be indexed by physical cache line. In some embodiments, the transaction history is recorded for the underlying memory addresses being accessed because a cache line may hold many different memory addresses. For example, the history table 110 may be indexed by memory address. Mapping history to a unique address may be more accurate.

Figure 2A:
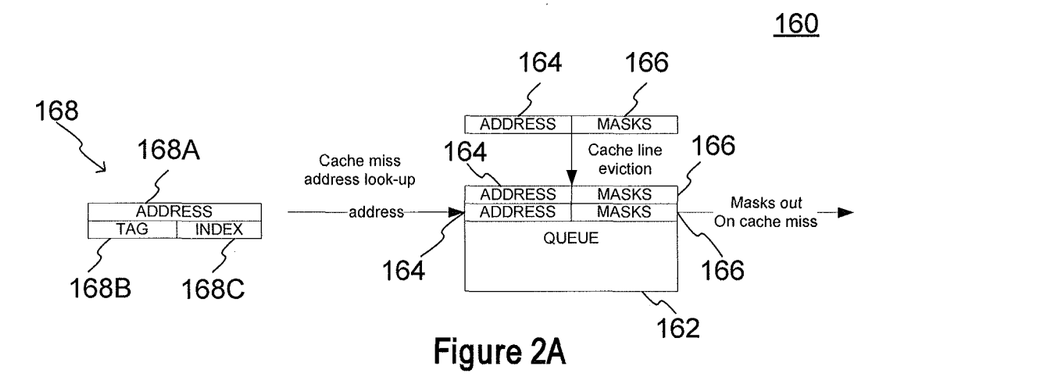
FIG. 2A is a block diagram of transaction history table according to an embodiment of the invention.
Figure 2B:
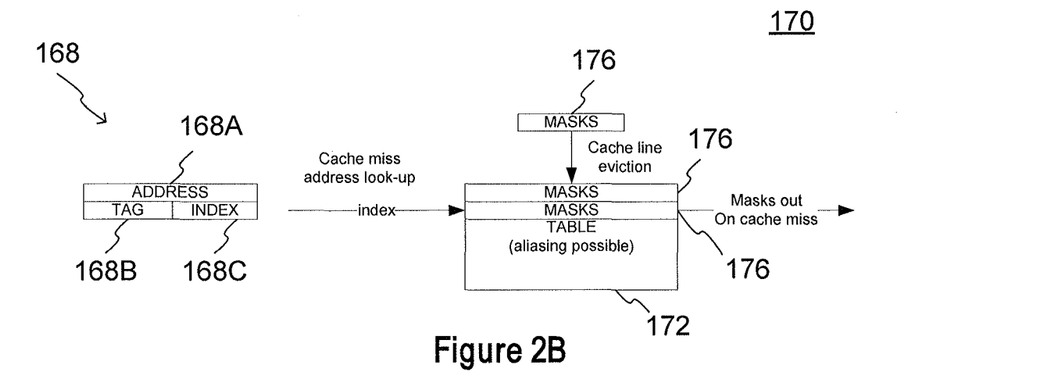
FIG. 2B is a block diagram of transaction history table according to an embodiment of the invention.
Figure 2C:
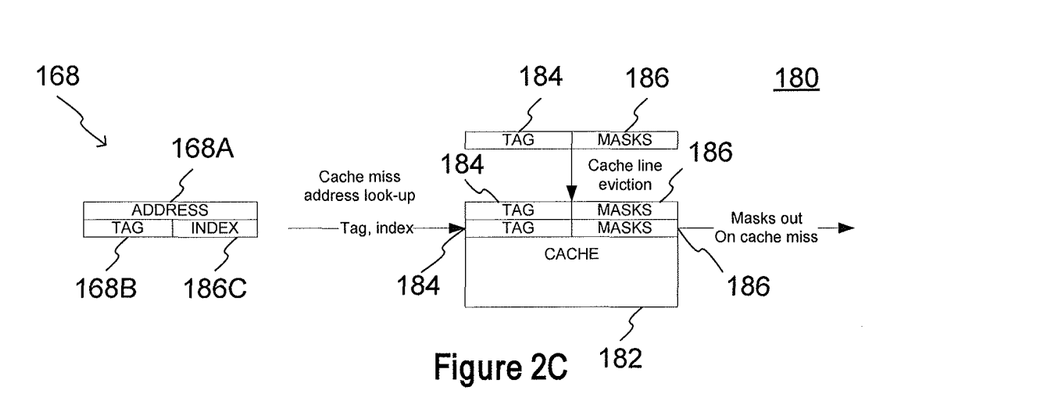
FIG. 2C is a block diagram of transaction history table according to an embodiment of the invention.

The history table 110 may be structured as a queue, table, cache, or other structure. New FIGS. 2A-2C illustrate examples of structuring a history table as a queue, table, and cache, respectively. As will be described in more detail below, read and/or write masks associated with segments of the cache block 130 responsive to a cache line being evicted. A cache line may be evicted to make room to cache other information.

FIG. 2A illustrates an embodiment of a history table 160 that is structured as a queue 162, and the masks 166 are indexed according to an associated memory address 164. Upon eviction, a memory address 164 and associated mask or masks 166 are pushed into the queue 162. On request, (e.g., entering the cache) information 168 is provided, some or all of which may be used to determine whether associated masks are in the queue 162. In the example of FIG. 2A, the information 168 includes a memory address 168A, a tag 168B, and an index 168C. The information 168 may, however, include greater, fewer, additional, and/or alternative information than that shown in FIG. 2A. In operation, responsive to a cache miss the memory address 168A is used to determine (based on the addresses 164) whether masks 166 associated with the memory address 168A are in the queue 162. If the memory address 168A is found in the queue (e.g., matches an memory address 164), the associated masks 166 are read out, and may be further removed from the queue 162.

FIG. 2B illustrates an embodiment of a history table 170 that is structured as a table 172, and the masks 176 are indexed according to a portion of an associated memory address. Upon eviction, mask or masks 176 are written to a table entry corresponding to an index, which in the example of FIG. 2B, may be a portion of an associated memory address. For example, the index may be n binary digits ("n" being greater than 0) of the associated memory address. On request, (e.g., entering the cache) information 168 is provided, some or all of which may be used to determine whether associated masks are in the table 172. In the example of FIG. 2B, the information 168 includes a memory address 168A, a tag 168B, and an index 168C. The index 168C may be based at least in part on the memory address 168A, for example, the n-lower bits of the memory address 168A. The information 168 may, however, include greater, fewer, additional, and/or alternative information than that shown in FIG. 2B. In operation, responsive to a cache miss the index 168C is used to identify a corresponding entry in the table 172. The masks 176 associated with the corresponding table entry are read out. An index may be the same value for multiple memory addresses since only a portion of a memory address is used as the index. As a result, the masks stored in a table entry may be associated with a different memory address that has the same index 168C as for the requested memory address 168A. The masks read out may be updated accordingly, as memory transactions are executed for the cached information associated with the memory address 168A.

FIG. 2C illustrates an embodiment of a history table 160 that is structured as a cache 182, and the masks 186 are indexed according to an index. The index in the example of FIG. 2C may be a tag, and index, or combinations thereof. Upon eviction, a tag 184 and associated mask or masks 186 are recorded in the cache 182. On request, (e.g., entering the cache) information 168 is provided, some or all of which may be used to determine whether associated masks are in the cache 182. In the example of FIG. 2C, the information 168 includes a memory address 168A, a tag 168B, and an index 168C. The information 168 may, however, include greater, fewer, additional, and/or alternative information than that shown in FIG. 2C. In operation, responsive to a cache miss the tag 168B and/or index 168C may be used to determine (e.g., based on the tag 184) whether masks 186 associated with the tag 168B, index 168C are in the cache 182. If the tag 168B, index 168C is found in the cache (e.g., matches a tag 184), the associated masks 186 are read out, and may be further removed from the cache 182.

It will be appreciated that embodiments of the present invention are not limited to the specific examples of transaction tables 160, 170, and 180 of FIGS. 2A-2C.

In some embodiments, the history table 110 is implemented as a queue where the read and write masks of evicted cache lines are pushed onto the queue. The read and write masks may themselves be cached where a mask cache is provided. The history table 110 may be stored in a memory accessible by the mask control 120 and the read and write-back logic 140. The memory may be included in the same device as the other components, or in some embodiments, included in a separate device from other components. In some embodiments, the history table 110 is stored in main memory 20. The history table 110 may be stored in other memory as well.

The mask control 120 is configured to determine which segments of information to fetch and/or evict from the cache block 130 based on the transaction history (e.g., the read masks and/or write masks associated with the cache block and stored in the transaction history table 110). For example, information may be pre-fetched from memory 20 for segments of the cache lines based on the transaction history, rather than fetching the information for an entire cache line from memory. That is, information in addition to the specific information for a current request may be pre-fetched from memory in anticipation of that additional information being requested in the future. The read and write-back logic 140 is configured to execute transactions between the cache block 130 and the main memory 20 (e.g., read information from the main memory 20 into the cache block 130 and write information from the cache block to the main memory).

Segmenting the cache lines of the cache block 130 allows for less than an entire cache line of information to be read from or written to main memory 20. The number of transactions with main memory 20 may be reduced, and as a result performance may be increased due to lowered demand on the memory, by reading and writing segments of information rather than an entire cache line of information, and as a result, power consumption related to memory transactions may be reduced, and for some memories, wear on memory cells may be reduced as well. For example, for cache write-backs, the dirty segments of information may be grouped together before performing the write-back to result in fewer transactions compared with full cache line write-backs. As previously discussed, which segments of information are read into the cache or written from the cache may be based on the read mask, write mask, or both masks, which may represent a transaction history associated with the cache block or memory location.

Figure 3:
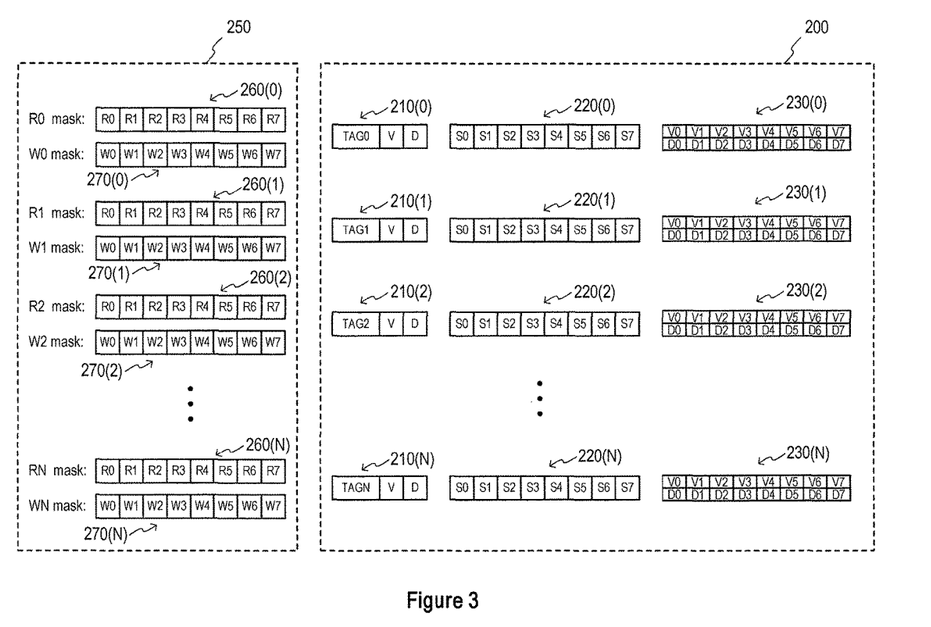
FIG. 3 is a block diagram illustrating a cache block and transaction history table according to an embodiment of the invention.

FIG. 3 illustrates a cache block 200 and a transaction history table 250 according to one or more embodiments of the invention. The cache block 200 may be used for the cache block 130 of FIG. 1 and the history table 250 may be used for the transaction history table 110. The cache block 200 includes cache lines 220(0)-(N), tag and line valid/dirty bits 210(0)-(N), and segment valid/dirty bits 230(0)-(N). N is a non-zero number and used in FIG. 3 to represent that any number of cache lines 220, and associated tag and line valid/dirty bits 210 and segment valid/dirty bits 230 may be included in a cache block. The tag and line valid/dirty bits 210 are associated with a respective cache line 220, and include a TAG portion having the cache line tag information, valid bit V and dirty bit D. The TAG portion is used to store tag information that identifies the information stored in the respective cache line 220, for example, tag information that identifies the address(as) in main memory where the information (stored in the cache line) is or will be stored. The valid bit V when set indicates that the information in the respective cache line is valid information and the dirty bit D when set indicates that the information in the respective cache line 220 has changed from when the information was read from memory (e.g., main memory), and should be written back to memory to update the information stored in memory. The cache lines 220 are segmented into a plurality of cache segments. In the embodiment of FIG. 3, the cache lines 220 are segmented into 8 segments S0-S7. As previously discussed, a cache line 220 may be segmented into any number of segments and of any size, and as such, FIG. 3 is not intended to limit the scope of the invention to the particular embodiment illustrated. The valid/dirty bits 230 include bits V0-V7, D0-D7 for the segment S0-S7, and are used to indicate the state for the respective segment of information, for example, whether the information cached in the respective segment is valid or dirty.

The history table 250 may store a plurality of read masks 260(0)-(N) for each cache line 220. In the embodiment of FIG. 3, the history table 250 also stores a plurality of write masks 270(0)-(N) for each cache line 220. The plurality of read masks and write masks for a respective cache line 220 represents a transaction history for the segments of the respective cache line. In some embodiments, the read and write masks may be stored for memory addresses. In such embodiments, the use of memory addresses may provide greater precision in maintaining a transaction history. A greater number of read and write masks stored may provide greater insight into the transaction history for the segments of the cache line, and as a result, may be helpful in determining the information to read from memory and/or to write to memory to update the information cached in particular ones of the segments. The read masks 260 include a bit R0-R7 for each segment S0-S7 of a cache line 220, and the write masks 270 likewise include a bit W0-W7 for each of the segments S0-S7. The bits R0-R7 of a read mask 260 may be set when information is read from the respective segment S0-S7 within a time period, and the bits W0-W7 of a write mask 270 may be set when information is written to the respective segment S0-S7 within the time period. The time period may be, for example, the lifetime of the cache line from first access to eviction, or may be a shorter, or longer time.

The read and write masks 260, 270 represent a transaction history for the respective cache line, and may be used to determine the information to cache in one or more segments of the cache line. Additionally and/or alternatively, read and write masks may be used that represent a transaction history for the addresses in main memory associated with the cached information. The read and write masks 260, 270 may be referenced when executing read and write transactions associated with the cache. For example, the transaction history of a cache line as represented by its associated read mask 260 may aid in determining the information to be read from main memory and cached in segments of the cache line. Additionally, the transaction history of a cache line as represented by its associated write mask 270 may aid in predicting the information to be written to main memory (e.g., "dirty" segments) in a write-back operation. For example, such a prediction could be used to reserve and prepare a non-volatile memory location for writing, or pre-charging an open DRAM page in anticipation of a future write to a different page. The read and write masks 260, 270 for a cache line may also be referenced when information is read from the main memory and initially cached in the cache line. In some embodiments, the history table 110 may be checked for read and write masks associated with a cache line when a cache line miss occurs. For example, a Bloom filter may be used in some embodiments to quickly check for the presence of read and write masks in the history table 110. The read and write masks may be indexed in the history table 110 in a variety of ways. For example, the history table 110 may be memory address based, cache line based, or other arrangement. A memory address based arrangement may be used for more accuracy and reduced aliasing. A conventional pre-fetching mechanism may be used with the read and/or write masks to pre-fetch multiple cache lines of information in anticipation of actual access.

The read and write masks 260, 270 may be updated during the lifetime of a cache line, that is, from the time the information is initially cached until the time the cached information is evicted from the cache line 220. The read and write masks 260, 270 may be stored responsive to evicting the associated cache line, for example, the updated read and write masks may be stored in the history table 110 for later reference. During the lifetime of a cache line, the associated read and write masks 260, 270 may be cleared. For example, the read and write masks 260, 270 may cleared after a timeout period elapses. The timeout period may be timed by a timer. The timer may be implemented in some embodiments by a counter. The timeout period may be reset responsive to a cache line and segment hit for a read or write transaction. Clearing of the read and/or write masks 260, 270 may allow the masks to be updated with new transaction history when the former transaction history does not accurately reflect the information that should be cached (e.g., implied by no cache line and segments hits during a timeout period). In this manner, the transactions between the cache block 200 and main memory may be adaptable to changing memory access patterns.

Read operations according to various embodiments of the invention will be described with reference to FIGS. 4A-4C. The examples of FIGS. 4A-4C are described with a 64-byte cache line and 8-byte segments, however, cache lines and segments of other sizes may be used as well without departing from the scope of the invention.

Figure 4A:
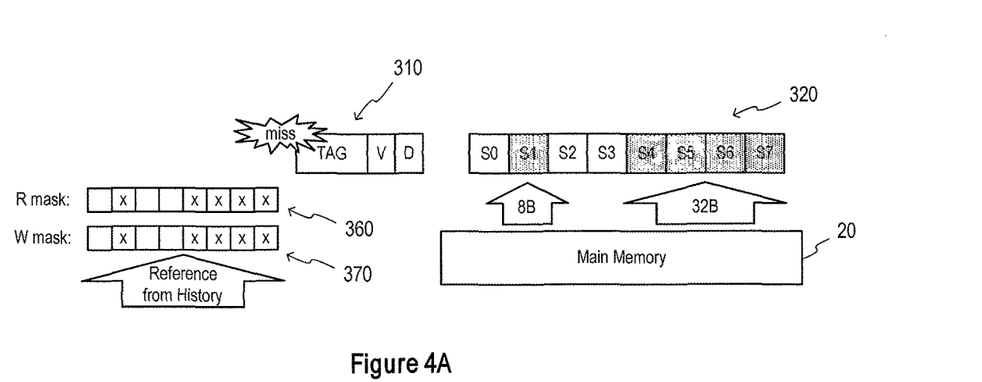
FIG. 4A is a diagram illustrating an example operation of a cache line read miss according to an embodiment of the invention.
Figure 4B:
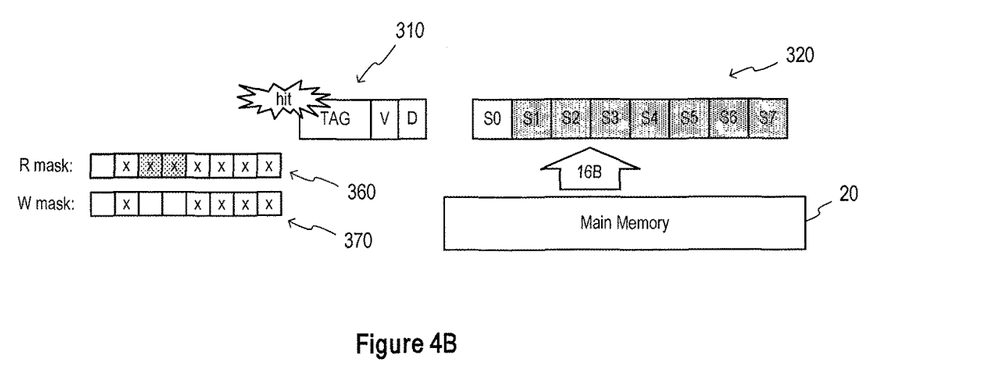
FIG. 4B is a diagram illustrating an example operation of a segment read miss according to an embodiment of the invention.
Figure 4C:
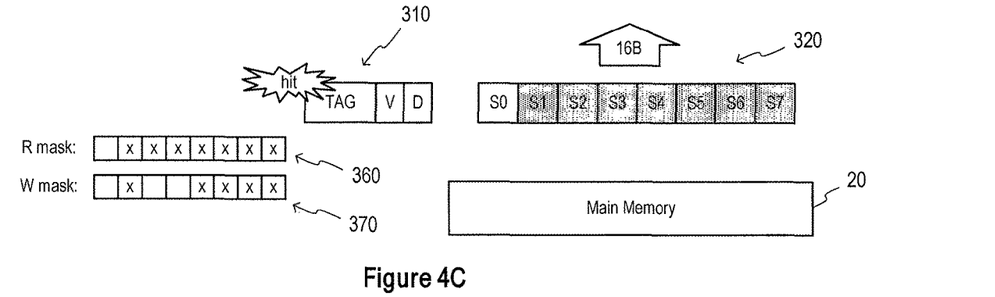
FIG. 4C is a diagram illustrating an example operation of a segment read hit according to an embodiment of the invention.

FIG. 4A illustrates an example operation of a cache line read miss according to an embodiment of the invention. A cache line read miss occurs when no cache line of a cache block includes any information associated with the same cache tag 310 as the information requested. For example, a cache line read miss is typically indicated when none of the cache tags for the cache lines in the cache block correspond to the address or addresses in main memory associated with the information requested. A cache tag may be generated from a value representing a range of memory addresses, where the range of memory addresses includes the memory address for the requested information. When a cache line read miss occurs, a cache line 320 in the cache block being addressed is evicted (including write-back of dirty segments) if necessary, to make space for a new cache line of information. Then, the main memory 20 will be accessed to read the requested information and cache the information in the cache line 320. As part of the process of reading the requested information from the main memory 20, the cache tag 310 associated with the cache line 320 is updated with the cache tag for the requested information. Additionally, the read and/or write masks 360, 370 associated with the cache tag for the requested information are referenced (e.g., read from the history table 110). As previously discussed, transaction histories including read and/or write masks may be stored for cache lines and indexed by respective cache tag values. For cache lines (or memory addresses) not currently cached in the cache block, the respective transaction history is referenced when a memory transaction is requested for the cache line (or memory address).

In the example of FIG. 4A, the read mask 360 indicates that information associated with the same cache tag as the requested information had been read from segments S1 and S4-S7 the last time information associated with the same tag as the requested information had been cached and the write mask 370 indicates that information had been written to segments S1 and S4-S7 the last time information associated with the same tag as the requested information had been cached. Based on the read mask 360, information stored in memory at addresses that correspond to the relative positions of segments S1 and S4-S7 are read from memory and cached in segments S1 and S4-S7 of cache line 320. In addition, any other segments of information indicated by a write mask and associated with the same cache tag as the requested information may also be read from memory responsive to the read miss (e.g., in case the segment of information is only partially written during a future write operation). 8-bytes are read from memory for the information cached in segment S1 and 32-bytes are read from memory for the information cached in segments S4-S7. It is assumed in the example of FIG. 4A that the requested information is included in the information read from memory and cached in segments S1 and S4-S7. Although not shown in FIG. 4A, the valid bits for the segments S1 and S4-S7 are set to indicate valid information. The requested information, now cached in at least one of segments S1 and S4-S7, can now be provided to satisfy the read request.

The example of FIG. 4A illustrates that the information read from main memory 20 and cached in a cache line 320 may be based at least in part on the transaction history as represented by the read and/or write masks 360, 370. Less than an entire cache line of information is read from the main memory 20, thus potentially saving power compared to reading an entire cache line of information. However, more than just the requested information can be read. The additional information read from the main memory 20 is that information predicted to be requested before the cache line 320 is evicted based on the transaction history represented by the read mask and/or write mask. By predicting the information that should be cached in cache line 320, read time may be reduced because the information is already cached and does not need to be read from main memory 20 if the information is requested before the cache line 320 is evicted.

FIG. 4B illustrates an example operation of a segment read miss according to an embodiment of the invention. A segment read miss occurs when the cache block includes a cache line that caches information associated with the same cache tag as the requested information, but none of the segments of the cache line currently caches the requested information. The main memory 20 is accessed to read the requested information into the cache line 320. In the example of FIG. 4B, the requested information corresponds to information that is cached in segments S2 and/or S3. Although the requested information may correspond to information cached in either segment S2 or S3, information cached in both segments may be nonetheless read and cached based on a prediction that information from one or the other segment will be requested before the cache line is evicted. The read mask 360 is updated by setting the bits corresponding to segments S2 and S3 to reflect the caching of information in segments S2 and S3 so that the transaction history is current. Although not shown in FIG. 4B, the valid bits corresponding to segments S2 and S3 are set to indicate that the information cached in segments S2 and S3 are valid. The requested information, now cached in segments S2 and/or S3, can be provided to satisfy the read request.

FIG. 4C illustrates an example operation of a segment read hit according to an embodiment of the invention. A segment read hit occurs when the cache block includes a cache line that caches information associated with the same cache tag as the requested information, and the requested information is cached in one of the segments of the cache line. As a result, the main memory 20 does not need to be accessed and the requested information can be provided by the cache block 200. A timeout timer may be reset when a segment read hit occurs, thus maintaining the status of the read and write masks for at least another timeout period. The read and write masks 360, 370 of a cache line 320 may be cleared after the timeout period elapses. Clearing the read and write masks 360, 370 may facilitate adaptation of the transactions between the cache block and main memory when the read and/or write masks 360, 370 do not reflect current access patterns for the cache block (e.g., as represented by the timeout period elapsing before being reset by a segment hit).

The example operations of FIGS. 3A-3C illustrate reading requested information from memory for less than an entire cache line. At least the requested information is read from memory and cached in a segment(s) of the cache line. Information in addition to the requested information may also be read from memory and cached in segment(s) of the cache line. The additional information that is cached in the segment(s) may be based on the transaction history for the cache line and/or the addresses in main memory cached in the cache block, which may be represented by mask information associated with the cache line and/or the addresses in main memory cached in the cache block. For example, a read mask for the cache line may be referenced when determining what additional information is to be read from memory and cached in the segment(s), and in some embodiments, a write mask may additionally or alternatively be referenced as well.

Write operations according to various embodiments of the invention will be described with reference to FIGS. 4A-5D. The examples of FIGS. 5A-5D are described with a 64-byte cache line and 8-byte segments, however, cache lines and segments of other sizes may be used as well without departing from the scope of the invention.

Figure 5A:
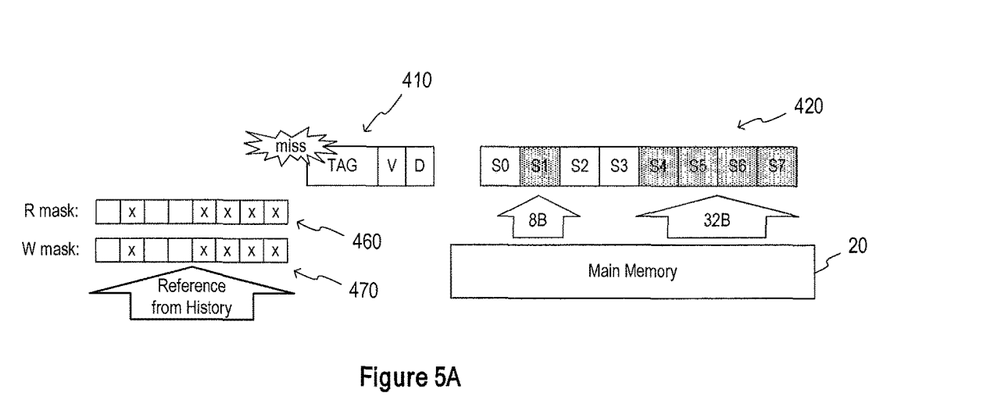
FIG. 5A is a diagram illustrating an example operation of a cache line write miss according to an embodiment of the invention.

FIG. 5A illustrates an example operation of a cache line write miss according to an embodiment of the invention. A cache line write miss occurs when no cache line of a cache block is associated with the same cache tag 410 as that associated with the information to be written. When a cache line write miss occurs, a cache line 420 in the cache block being addressed is evicted (including write-back of dirty segments), if necessary, to make space for a new cache line of information. Then, as shown in FIG. 5A, before new information is actually written to segments of the cache line 420 the main memory 20 will be accessed to first read and cache information associated with the same cache tag as the information to be written. As part of the process of reading the information from the main memory 20, the read and/or write masks 460, 470 associated with the same cache tag as the data to be written can be referenced (e.g., read from the history table 110). In the example of FIG. 5A, the read mask 460 indicates that information associated with the same cache tag as the information to be written had been read from segments S1 and S4-S7 and the write mask 470 indicates that information had been written to segments S1 and S4-S7 the last time information associated with the same tag had been cached. Based on the read mask 460 (and/or write mask 470), information stored in main memory 20 at addresses that correspond to the relative positions of segments S1 and S4-S7 is read and cached in segments S1 and S4-S7 of cache line 420. 8-bytes are read for the information cached in segment S1 and 32-bytes are read from the information cached in segments S4-S7. Although not shown in FIG. 5A, the valid bits for the segments S1 and S4-S7 are set to indicate valid information. Note that if a segment is only to be partially written, at least the remaining bits of the segment have to be read first in order for the segment data to be consistent with main memory contents.

Figure 5B:
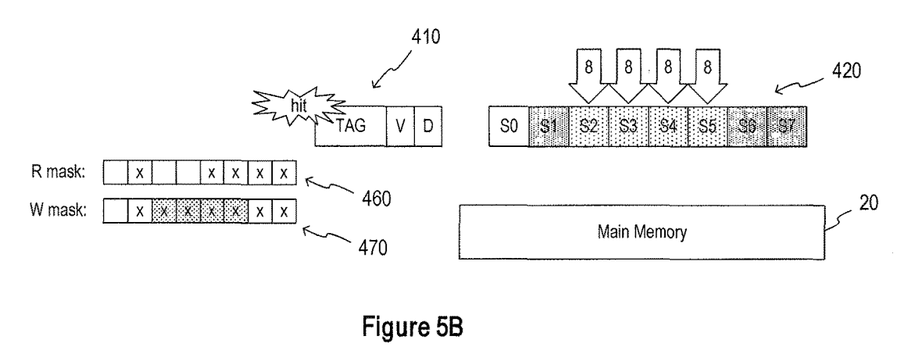
FIG. 5B is a diagram illustrating an example operation according to an embodiment of the invention that may be performed following the cache line write miss operation of FIG. 5A, for a segment write miss, and/or for a segment write hit.

FIG. 5B illustrates an example operation according to an embodiment of the invention that may be performed following the operation of FIG. 5A to complete the caching of data to be written to the main memory 20. The example operation of FIG. 5B may also be performed for a segment write miss. A segment write miss occurs when the cache block includes a cache line that caches information associated with the same cache tag as the information to be written, but none of the segments of the cache line currently caches information corresponding to the address in memory where the information is to be written. For segment write misses, the written segment or segments may also be read first from memory in cases where the written data only partially modifies a segment to ensure that when the segment finally gets written back to memory, the portion of the segment not modified by the write data is still consistent with the original memory state.

In the example of FIG. 5B, the information to be written is written to segments S2-S5 of cache line 420. The bits of the write mask 470 corresponding to segments S2-S5 are updated to reflect the writing of the information to the segments. Although not shown in FIG. 5B, the dirty bits for segments S2-S5 are set to indicate that the information cached by these segments is dirty, that is, segments S2-S5 now cache information that should be written-back to the main memory 20.

The example operation of FIG. 5B may also be performed when a segment write hit occurs. A segment write hit occurs when the cache block includes a cache line that caches information associated with the same cache tag 410 as the information to be written, including information from the address in main memory 20 to which the information to be written will be written. As with a segment write miss, the information to be written is written to the segments corresponding to the addresses in memory where the information is to be written. In contrast to a segment write miss, a timeout timer may also be reset when a segment write hit occurs. As previously discussed, the timeout timer may be used to measure a timeout period, at the end of which the read and write masks 460, 470 may be cleared. Resetting the timeout timer, for example, when a segment write hit occurs prevents the write mask 470 from being cleared. Not clearing the write mask 470 suggests that the write mask accurately reflects the current access patterns for the cache line 420.

Figure 5C:
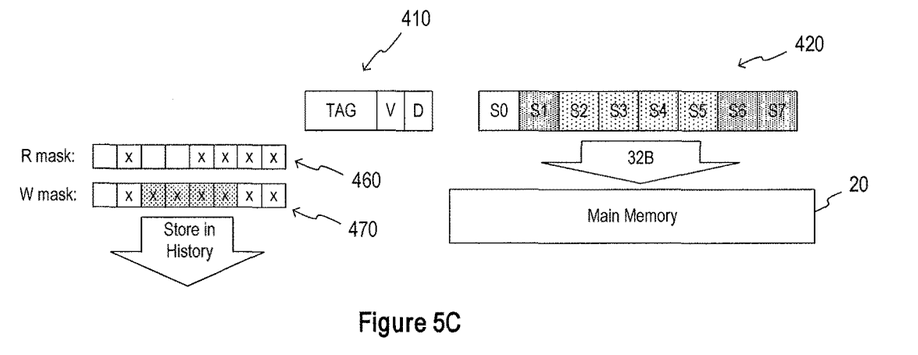
FIG. 5C is a diagram illustrating an example write-back operation according to an embodiment of the invention.

FIG. 5C illustrates an example write-back operation according to an embodiment of the invention. A write-back operation can be used to update the information stored in main memory 20 with the cached information, and may occur when the cache line is to be evicted. A cache line may be evicted to make room when a cache line is needed to cache other information. As part of the write-back operation, the current state of the read and write masks 460, 470 associated with the cache tag 410 are stored in the history table 110. In some embodiments, the read and write masks 460, 470 are stored with other read and write masks associated with the same cache tag. However, in some embodiments, the current read and write masks 460, 470 are stored and replace a previously stored read and write mask associated with the same cache tag. The number of read and write masks stored in the history table 110 may be based on various considerations, for example, the size of the history table 110, the size of the cache block 130, as well as other considerations.

The "dirty" information, for example, cached in segments S2-S5 for the present example, are written-back to main memory 20. The segments caching dirty information may be identified by the dirty bits (not shown), which were set at the time the information was written to segments S2-S5. In the example of FIG. 5C, the information cached by segments S2-S5 is written-back to main memory 20. Following the write-back of the information, the cache line 420 may be evicted.

Figure 5D:
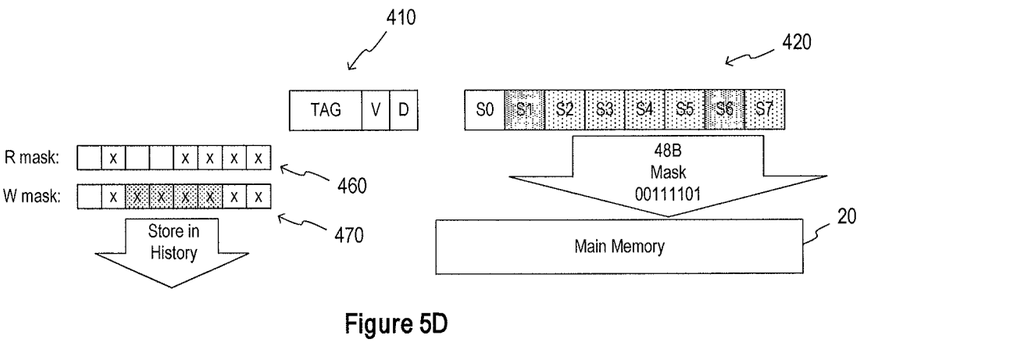
FIG. 5D is a diagram illustrating an example write-back operation according to another embodiment of the invention.

FIG. 5D illustrates an example write-back operation according to an embodiment of the invention. As with the write-back operation of FIG. 5C, as part of the write-back operation of FIG. 5D, the current state of the read and write masks 460, 470 are stored in the history table 110. In contrast to the write-back operation of FIG. 5C, S7 also caches dirty information in addition to segments S2-S5, and as such, the information of these segments are written back to main memory 20. In writing-back the information to the main memory 20, the information of segments S2-S7 are provided to the main memory 20 in the write-back operation of FIG. 5D. Although the information cached in segment S6 is not dirty, it may be more efficient to write-back the information cached in segment S6 with the information cached in segments S2-S5 and S7 and use a memory mask (e.g., "00111101") to prevent the writing of information of segment S6. Mask signals may be provided to the memories of main memory 20, for example, to carry out a memory mask.

Writing-back the information cached in segments S2-S5 and S7 may be more efficient by including the information cached in segment S6. For example, it may be more efficient where the write-back can be performed by issuing one memory write command to the main memory 20 to write-back information cached in contiguous segments S2-S7 (and using a memory mask to prevent the write-back of the information cached in segment S6), rather than issuing two memory write commands: one for writing back the information of segments S2-S7 and another one for writing back the information of segment S6. Although FIG. 5D illustrates a particular example where the information for segments S2-S7 are provided to the main memory 20 as part of the write-back operation, writing-back the dirty information of segments S2-S5 and S7 may be performed by providing the information cached by a greater or lesser number of segments, and in one or more memory commands, without departing from the scope of the present invention.

The embodiments of FIGS. 4A-4C and 5A-5D are described as having a read mask and write mask associated with a cache line or with memory addresses. In some embodiments, however, a write mask may not be used, and a cache line has only an associated read mask. In embodiments including a write mask for a cache line, the write mask may be used, for example, to measure write transactions for endurance calculations in non-volatile memories. A pre-fetcher combined with the write masks could be used by an address mapping scheme (e.g., FTL) to prepare an efficient logical block-to-page mapping in advance of expected write operations. Write masks may also be used on read or write misses to pre-fetch segments indicated by the write mask because partial writes to a segment may require that the segment is loaded from memory before modification, which ensures that unmodified bits remain consistent with the main memory state.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An apparatus, comprising:
a cache block configured to store information in a plurality of cache lines, each of the plurality of cache lines segmented into segments;
a memory configured to store a transaction history including read and write masks associated with each of the segments of the plurality of cache lines;
a mask control coupled to the memory, the mask control configured to determine related segments of information for a cache line to read and/or write based on the read and write masks of the transaction history; and
read and write-back logic coupled to the cache block and transaction history table, the read and write-back logic configured to execute transactions associated with the cache block.

2. The apparatus of claim 1 wherein the read and write-back logic is configured to execute a transaction for less than all of the segments of a cache line.

3. The apparatus of claim 2 wherein the read and write-back logic is configured to execute a transaction for less than all of the segments of a cache line by using a memory mask.

4. The apparatus of claim 1 wherein the cache block includes segment valid and dirty bits for each of the segments of a cache line.

5. The apparatus of claim 1 wherein the cache block includes tag and valid/dirty bits for each one of the plurality of cache lines.

6. The apparatus of claim 1 wherein the memory is included in a separate device from the mask control and read and write-back logic.

7. The apparatus of claim 1, further comprising a timer configured to time a timeout period.

8. The apparatus of claim 1 wherein the transaction history comprises a transaction history table stored by the memory.

9. The apparatus of claim 8 wherein the transaction history table comprises a queue, table, cache, or combinations thereof.

10. The apparatus of claim 8 wherein the transaction history table comprises a queue, the queue indexed according to memory addresses.

11. The apparatus of claim 8 wherein the transaction history table comprises a table, the table indexed according to at least a portion of a memory address.

12. The apparatus of claim 8 wherein the transaction history table comprises a cache, the cache indexed according to an index.

13. The apparatus of claim 1, further comprising:
main memory coupled to the read and write-back logic and configured to store information.

14. The apparatus of claim 13 wherein the memory configured to store the transaction history is part of the main memory.

15. The apparatus of claim 13 wherein the memory configured to store the transaction history is separate from the main memory.

16. An apparatus, comprising:
a cache block configured to store information in a plurality of cache lines, each of the plurality of cache lines segmented into segments;
circuitry coupled to the cache block configured to allow for less than an entire cache line of information to be moved between a cache line of the plurality of cache lines and memory;
a memory coupled to the cache block and configured to store a transactional history data structure configured to store transaction histories for each segment of an evicted cache line; and
a mask control coupled to the cache block and configured to determine one or more segments of information for a cache line to read and/or write based at least in part on read and write masks stored in the transaction history for segments of the cache line.

17. The apparatus of claim 16, further comprising read and write-back logic coupled to the cache block and configured to execute transactions between the plurality of cache lines and memory.

18. The apparatus of claim 17, further comprising main memory coupled to the read and write-back logic and configured to store information.

19. The apparatus of claim 16, further comprising a transaction history table configured to store transaction histories associated with segments of the cache block.

20. The apparatus of claim 16, wherein the transaction history data structure is configured to store transaction histories associated with memory addresses.

21. The apparatus of claim 16, wherein the transaction history data structure is configured to store transaction histories associated with cache lines.

22. The apparatus of claim 16 wherein each of the segments for the plurality of cache lines is an N-byte segment, N being a multiple of 8.

23. A method, comprising:
referencing a transaction history including a plurality of read and write masks associated with a cache tag for information to be cached;
caching the information to be cached in a segment of a cache line;
determining additional information to cache in another segment of the cache line based on the plurality of read and write masks and the cache tag;
caching the additional information in another segment of the cache line; and
updating the transaction history to reflect the caching of the information to be cached and the addition information.

24. The method of claim 23, further comprising predicting information to be written to a main memory based at least in part on the plurality of write masks.

25. The method of claim 23, further comprising preparing a non-volatile memory location for writing based at least in part on the plurality of write masks.

26. The method of claim 23, further comprising precharging an open memory page in anticipation of a further write to a different page of memory based at least in part on the plurality of write masks.

27. The method of claim 23, further comprising:
timing a timeout period for the cache line;
receiving a request for the information to be cached or the additional information;
determining a segment hit for the cache line; and
resetting the timeout period for the cache line responsive to the segment hit.

28. The method of claim 27 wherein the request is a read request for the information to be cached or the additional information.

29. The method of claim 27 wherein the request is a write request for the information to be cached or the additional information.

30. The method of claim 27 wherein resetting the timeout period for the cache line responsive to the segment hit comprises resetting the timeout period for the cache line responsive to a segment write hit.

31. The method of claim 27 wherein resetting the timeout period for the cache line responsive to the segment hit comprises resetting the timeout period for the cache line responsive to a segment read hit.

* * * * *